US012783338B1

(12) United States Patent
Chaudhari et al.

(10) Patent No.: US 12,783,338 B1
(45) Date of Patent: Nov. 3, 2026

(54) IDENTIFYING AND RESPONDING TO INCIDENTS WITHIN A SYSTEM

(71) Applicant: Cisco Technology, Inc., San Jose, CA (US)

(72) Inventors: Amol Manohar Chaudhari, Dublin, CA (US); Giovanni Mola, San Francisco, CA (US); Utpal Thakrar, Goleta, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/103,401

(22) Filed: Jan. 30, 2023

Related U.S. Application Data

(60) Provisional application No. 63/427,751, filed on Nov. 23, 2022.

(51) Int. Cl.
*G06F 11/00* (2006.01)
*G06F 11/07* (2006.01)
*G06Q 30/0283* (2023.01)

(52) U.S. Cl.
CPC ........ *G06F 11/079* (2013.01); *G06F 11/0721* (2013.01); *G06Q 30/0283* (2013.01)

(58) Field of Classification Search
CPC ............... G06F 11/079; G06F 11/0721; G06F 11/0793; G06Q 30/0283
See application file for complete search history.

(56) References Cited

U.S. PATENT DOCUMENTS

| | | | | |
|---|---|---|---|---|
| 7,937,344 | B2 | 5/2011 | Baum et al. | |
| 8,112,425 | B2 | 2/2012 | Baum et al. | |
| 8,751,529 | B2 | 6/2014 | Zhang et al. | |
| 8,788,525 | B2 | 7/2014 | Neels et al. | |
| 9,215,240 | B2 | 12/2015 | Merza et al. | |
| 9,286,413 | B1 | 3/2016 | Coates et al. | |
| 10,127,258 | B2 | 11/2018 | Lamas et al. | |
| 11,004,005 | B1 | 5/2021 | Sirois | |
| 11,269,718 | B1 * | 3/2022 | Chen | G06F 11/079 |
| 2003/0187710 | A1 | 10/2003 | Baumer et al. | |
| 2005/0065841 | A1 * | 3/2005 | Middleton | G06Q 10/10 705/7.36 |
| 2005/0181835 | A1 * | 8/2005 | Lau | H04L 41/044 455/567 |
| 2006/0047551 | A1 | 3/2006 | Cotten et al. | |
| 2008/0091515 | A1 | 4/2008 | Thieberger et al. | |
| 2008/0313005 | A1 | 12/2008 | Nessland et al. | |
| 2014/0259170 | A1 | 9/2014 | Amsler | |

(Continued)

OTHER PUBLICATIONS

Splunk Enterprise 8.0.0 Overview, available online, retrieved May 20, 2020 from docs.splunk.com.

(Continued)

*Primary Examiner* — Joseph D Manoskey
(74) *Attorney, Agent, or Firm* — Kilpatrick Townsend & Stockton LLP

(57) ABSTRACT

An incident arising within a user system is analyzed to determine services directly or indirectly impacted by the incident. One or more responders are also determined for the incident based on user skill sets and details of the incident. The impacted services and the determined responders are then used to determine an impact of the incident within the user system, and a response to the incident may be prepared based on the impact. Response scheduling data may also be automatically prepared for the determined responders to minimize a mean time to resolution (MTTR) for the incident.

20 Claims, 12 Drawing Sheets

(56) References Cited

U.S. PATENT DOCUMENTS

| | | | |
|---|---|---|---|
| 2015/0358198 A1 | 12/2015 | Mahajan et al. | |
| 2017/0185475 A1 | 6/2017 | Dey et al. | |
| 2018/0322598 A1 | 11/2018 | Collins | |
| 2018/0375718 A1 | 12/2018 | Anand et al. | |
| 2019/0098106 A1 | 3/2019 | Mungel et al. | |
| 2020/0104402 A1* | 4/2020 | Burnett | G06F 16/288 |
| 2020/0293946 A1 | 9/2020 | Sachan et al. | |
| 2021/0097433 A1* | 4/2021 | Olgiati | G06F 11/0793 |
| 2021/0406041 A1 | 12/2021 | Saraiya et al. | |
| 2024/0037464 A1 | 2/2024 | Goswami et al. | |
| 2025/0123918 A1 | 4/2025 | Shilpi | |

OTHER PUBLICATIONS

Splunk Cloud 8.0.2004 User Manual, available online, retrieved May 20, 2020 from docs.splunk.com.

Splunk Quick Reference Guide, updated 2019, available online at https://www.splunk.com/pdfs/solution-guides/splunk-quick-reference-guide.pdf, retrieved May 20, 2020.

Carraso, David, "Exploring Splunk," published by CITO Research, New York, NY, Apr. 2012.

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

U.S. Appl. No. 18/103,405, "Final Office Action", Nov. 22, 2024, 16 pages.

U.S. Appl. No. 18/103,405, "Final Office Action", May 16, 2025, 16 pages.

Diao, et al., "Staffing Optimization in Complex Service Delivery", 7th International Conference on Network and Service Management, Oct. 24-28, 2011.

* cited by examiner

FIG. 11
1100
Schedule Name
Service Name
Cart Service
Payment Service
Checkout Service
Select
Schedule Name 1102
Confidence % 1104
Best alternative

IDENTIFYING AND RESPONDING TO INCIDENTS WITHIN A SYSTEM

RELATED APPLICATIONS

This application claims priority to U.S. Provisional Patent Application No. 63/427,751, titled "IDENTIFYING AND RESPONDING TO INCIDENTS WITHIN A SYSTEM," and filed Nov. 23, 2022, the entirety of which is incorporated by reference herein for all purposes.

BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon web services (AWS), and other data systems that store passively or actively generated data, including machine-generated data ("machine data"). The machine data can include log data, performance data, diagnostic data, metrics, tracing data, or any other data that can be analyzed to diagnose equipment performance problems, monitor user interactions, and to derive other insights.

When an incident arises within a data system (such as the failure of one or more components, one or more software incidents, etc.), the services provided by the data system may be negatively impacted. For example, a performance of these services may be degraded, the services may be interrupted, etc. This may result in lost revenue for the provider of the service, as well as repair costs for the provider to find and fix the problems causing the incident within the data system. Effectively identifying and responding to these incidents presents technical challenges.

BRIEF DESCRIPTION OF THE DRAWINGS

Illustrative examples are described in detail below with reference to the following figures.

DETAILED DESCRIPTION

Figure 1:
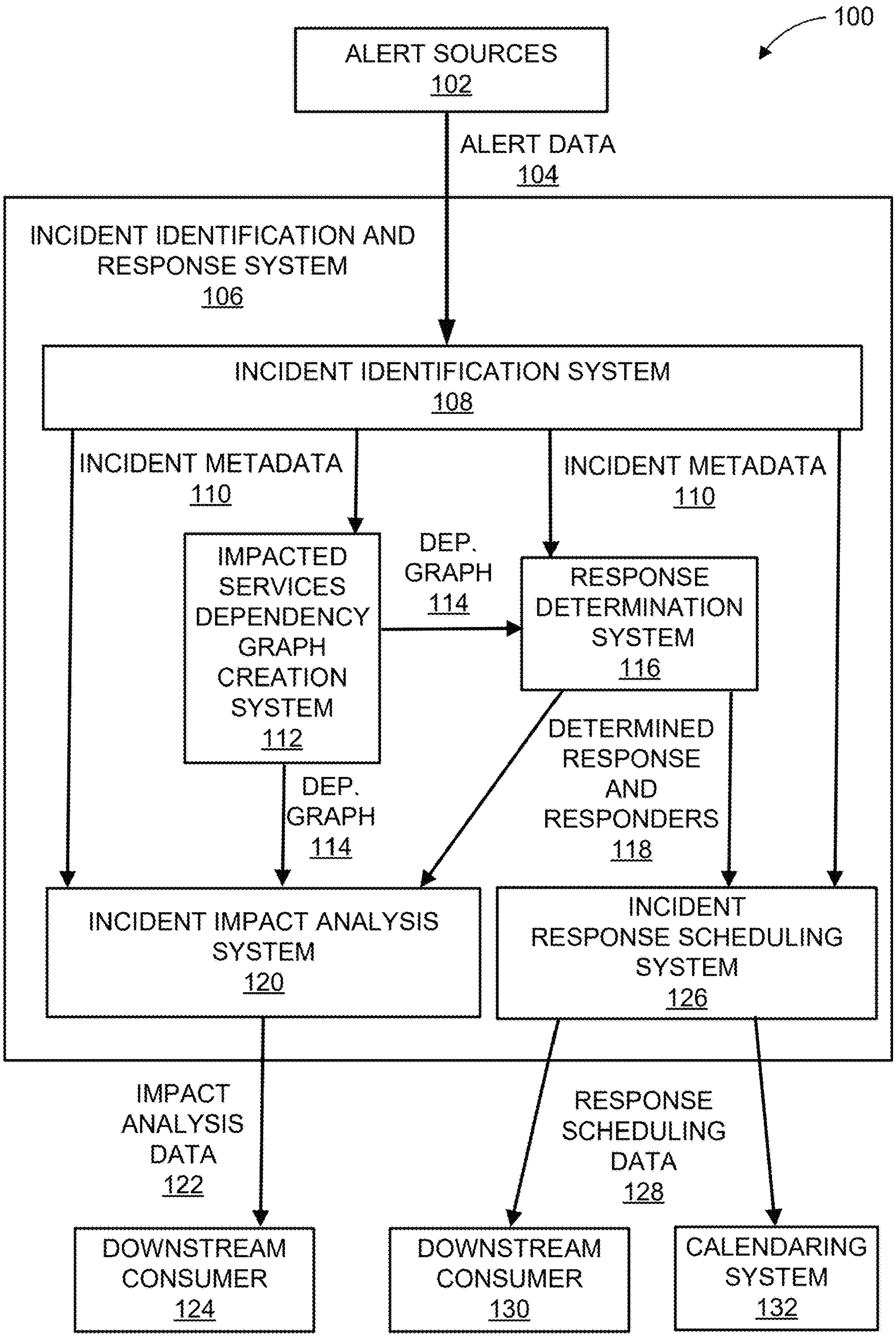
FIG. 1 is a block diagram of an environment for identifying and responding to incidents within a system, according to at least one implementation.

An observability system (such as the observability system 1201 of FIG. 12, etc.) can offer a unified environment to monitor infrastructure, applications, and supporting services in real-time, in a single pane of glass. The platform can integrate with common data sources to get data from on-premise and cloud infrastructure, applications and services, and user interfaces into the observability system.

In certain implementations, when data is sent from each layer of a full-stack environment to the observability system, the observability system can transform raw metrics, traces, and logs into actionable insights in the form of dashboards, visualizations, alerts, and more. The features of the observability system can enable users to quickly and intelligently respond to outages and identify root causes, while also giving users the data-driven guidance needed to optimize performance and productivity.

Additionally, in certain implementations the observability system can receive data from a user's environment using supported integrations to common data sources. The observability system can offer insights into infrastructure as well as the ability to perform powerful, capable analytics infrastructure and resources across hybrid and multi-cloud environments. Infrastructure monitoring offers support for a broad range of integrations for collecting all kinds of data, from system metrics for infrastructure components to custom data from applications.

Further, in certain implementations the observability system can collect traces and spans to monitor distributed applications. A trace is a collection of actions, or spans, that occur to complete a transaction. The observability system can collect and analyze every span and trace from each of the services connected to the observability system to give users full-fidelity access to all of their application data.

Further still, in certain implementations the observability system can provide insights about the performance and health of a front-end user experience of one or more applications. The observability system can collect performance metrics, web vitals, errors, and other forms of data to enable users to detect and troubleshoot problems in their application, measure the health of their application, and assess the performance of their user experience.

Also, in certain implementations the observability system can also synthetically measure the performance of web-based properties. The observability system can offer features that provide insights that enable users to optimize uptime and performance of application programming interfaces (APIs), service endpoints, and end user experiences and prevent web performance issues.

In addition, in certain implementations the observability system can troubleshoot applications and infrastructure behavior using high-context logs. Users can perform code-less queries on logs to detect the source of problems in their systems. Users can also extract fields from logs to set up log processing rules and transform their data as it arrives.

Furthermore, in certain implementations the observability system includes incident response software that aligns log management, monitoring, chat tools, and more for a single pane of glass into system health. The observability system can automate delivery of alerts to get the right alert, to the right user, at the right time.

Systems (such as cloud-based computing systems and multi-tenant computing systems) often contain a large number of diverse components that work together to perform one or more services. When an incident arises within a system (such as the failure of one or more components, one or more software incidents, etc.), the services provided by this system may be negatively impacted. For example, a performance of these services may be degraded, the services may be interrupted, etc. This may result in lost revenue for the provider of the service, as well as repair costs for the provider to find and fix the problems causing the incident within the system.

However, reducing a time taken to identify incidents as they arise within a system and to determine a scope and cost of such incidents may reduce a financial and performance impact of such incidents within the system. Likewise, accurately identifying appropriate entities (such as teams and/or individuals) to fix the incidents within the system, and efficiently scheduling such entities to perform such fixes, may also reduce repair costs and minimize lost revenue for the service provider.

To address this issue, an incident arising within a user system is analyzed to determine services directly or indirectly impacted by the incident. One or more responders are also determined for the incident based on user skill sets and details of the incident. The impacted services and the determined responders are then used to determine an impact of the incident within the user system, and a response to the incident may be prepared based on the impact. Response scheduling data may also be automatically prepared for the determined responders to minimize a mean time to resolution (MTTR) for the incident.

FIG. 1 illustrates a block diagram of an environment 100 for identifying and responding to incidents within a system, according to one exemplary implementation. As shown, alert data 104 is received at an incident identification and response system 106 from alert sources 102. In one implementation, the alert sources 102 may each include a device such as a client computing device, storage device, networking device, etc., one or more instances of software, one or more virtualized components (such as a container, etc.), etc. In another implementation, an agent may be installed on each of the alert sources 102 and may generate and send the alert data 104 to the incident identification and response system 106. In one implementation, the incident identification and response system 106 may be a component of an observability system (such as the observability system 1201 of FIG. 12, etc.).

Additionally, in one implementation, the alert data 104 may include one or more alerts, where each of the one or more alerts includes a predetermined occurrence within a component of the alert sources 102. For example, one of the alert sources 102 may include a hardware processor, and the alert data 104 may include an alert indicating that a utilization of the hardware processor has exceeded a predetermined threshold utilization amount. In another example, one of the alert sources 102 may include a software program, and the alert data 104 may include an alert indicating that the software program has encountered one or more errors.

Figure 6:
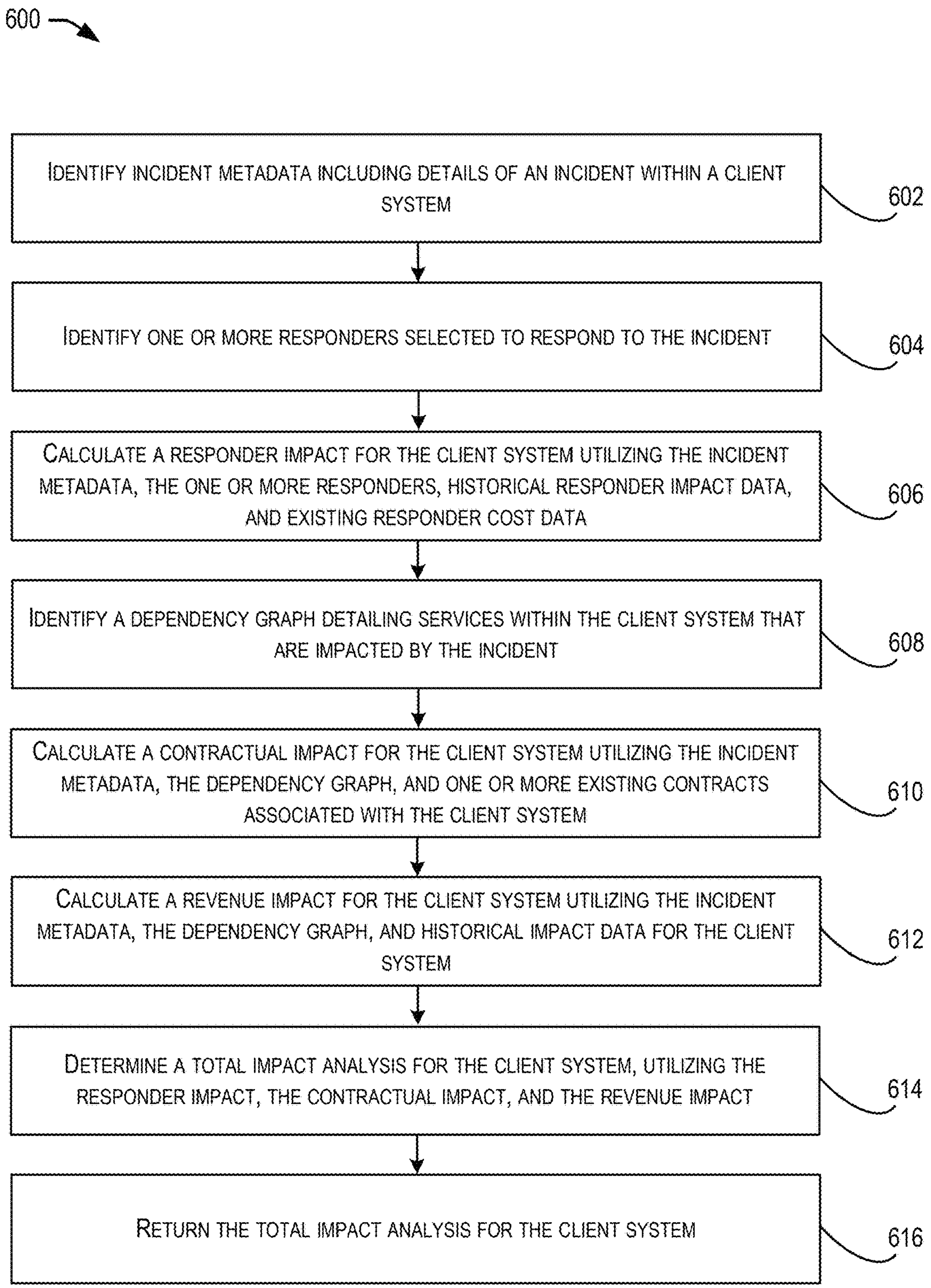
FIG. 6 illustrates an example method for determining an impact of an incident, according to at least one implementation.

Further, in one implementation, the alert data 104 may include metadata including a location of the alert, a time of the alert, etc. In another implementation, an incident identification system 108 may determine incident metadata 110 based on the alert data 104. For example, the incident identification system 108 may identify an occurrence of an incident by performing comparisons to historical alert data, by inputting the alert data 104 into a trained machine learning environment, etc. An exemplary method for identifying an occurrence of an incident is shown in FIG. 6.

Figure 7:
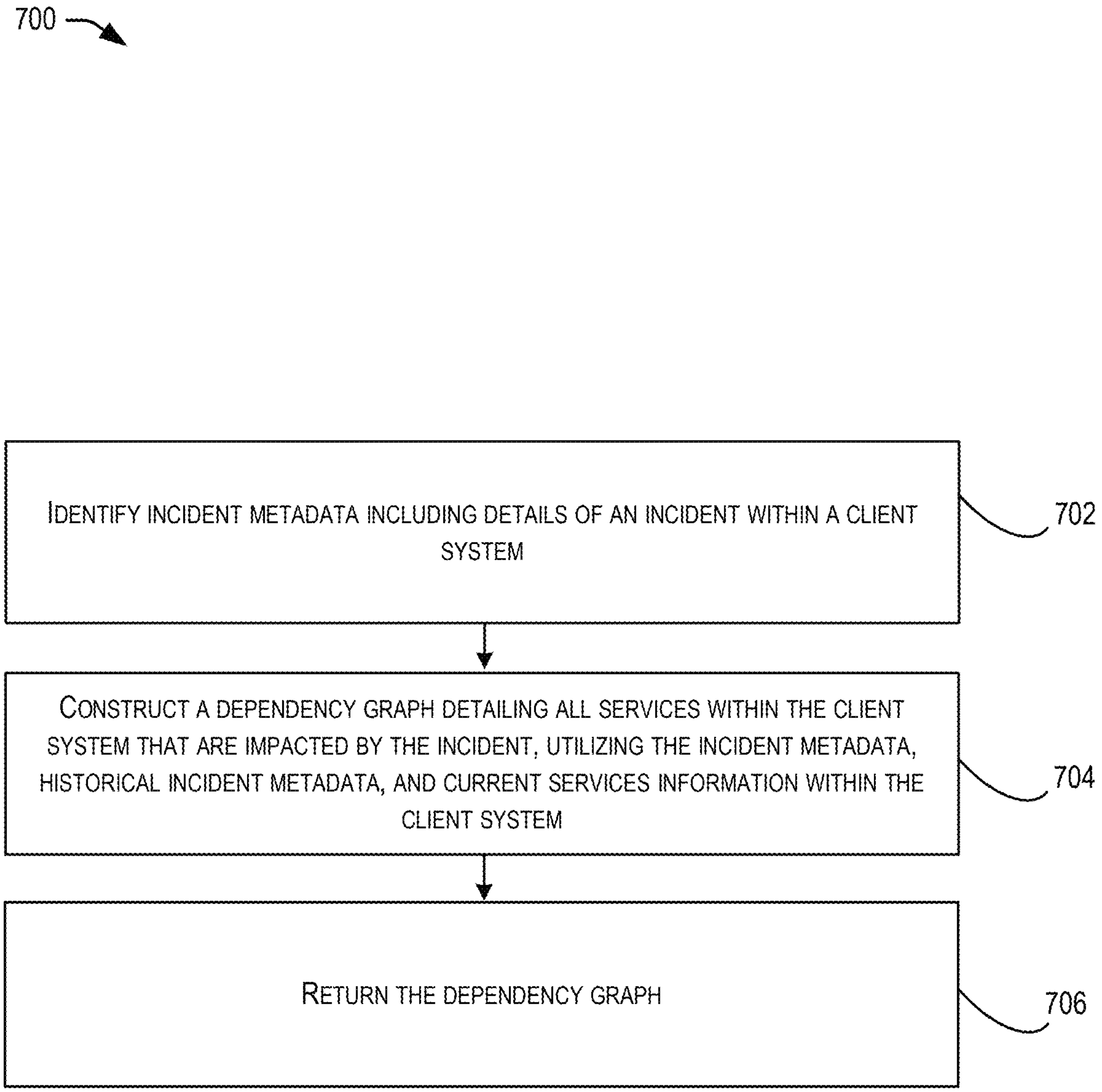
FIG. 7 illustrates an example method for determining a dependency graph indicating services directly or indirectly impacted by an incident, according to at least one implementation.

Further still, the incident metadata 110 is sent from the incident identification system 108 to an impacted services dependency graph creation system 112 that creates an impacted services dependency graph 114 utilizing the incident metadata 110. An exemplary method for creating an impacted services dependency graph 114 is shown in FIG. 7.

Figure 8:
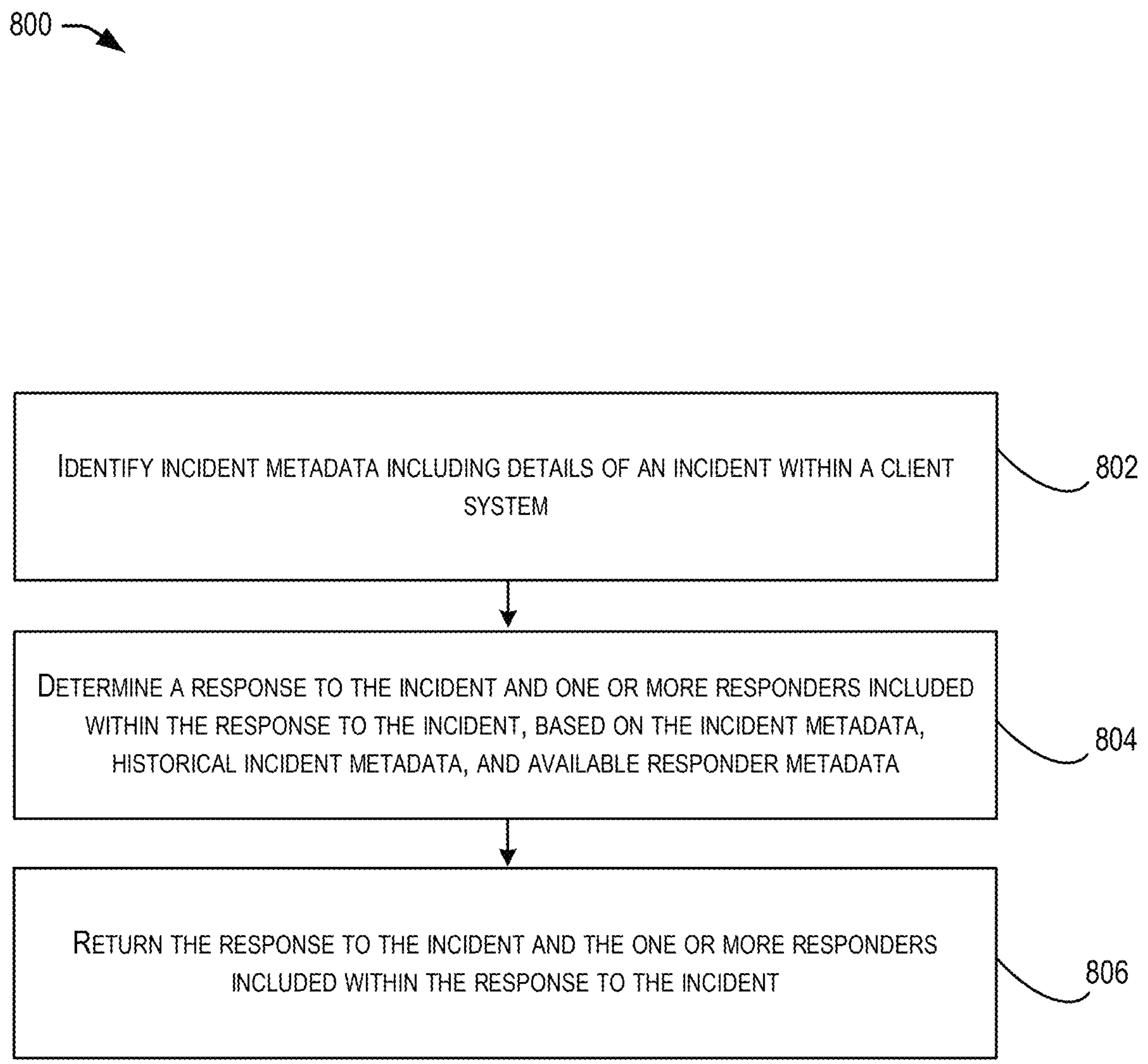
FIG. 8 illustrates an example method for determining a response to an incident and one or more responders included within the response, where the query includes a result threshold, according to at least one implementation.

Also, the incident metadata 110 and the impacted services dependency graph 114 are sent to a response determination system 116, which determines a response and responders 118 to the incident based on the received incident metadata 110 and impacted services dependency graph 114. An exemplary method for determining the response and responders 118 to the incident is shown in FIG. 8.

In addition, the incident metadata 110, the impacted services dependency graph 114, and the determined response and responders 118 are sent to an incident impact analysis system 120 that determines impact analysis data 122 based on these inputs. The impact analysis data 122 may include a total impact analysis of an incident on a client system. For example, an exemplary method for determining impact analysis data 122 is shown in FIG. 6. This impact analysis data 122 is then sent to a downstream consumer 124 such as one or more users, one or more applications, a graphical user interface (GUI), etc.

Figure 9:
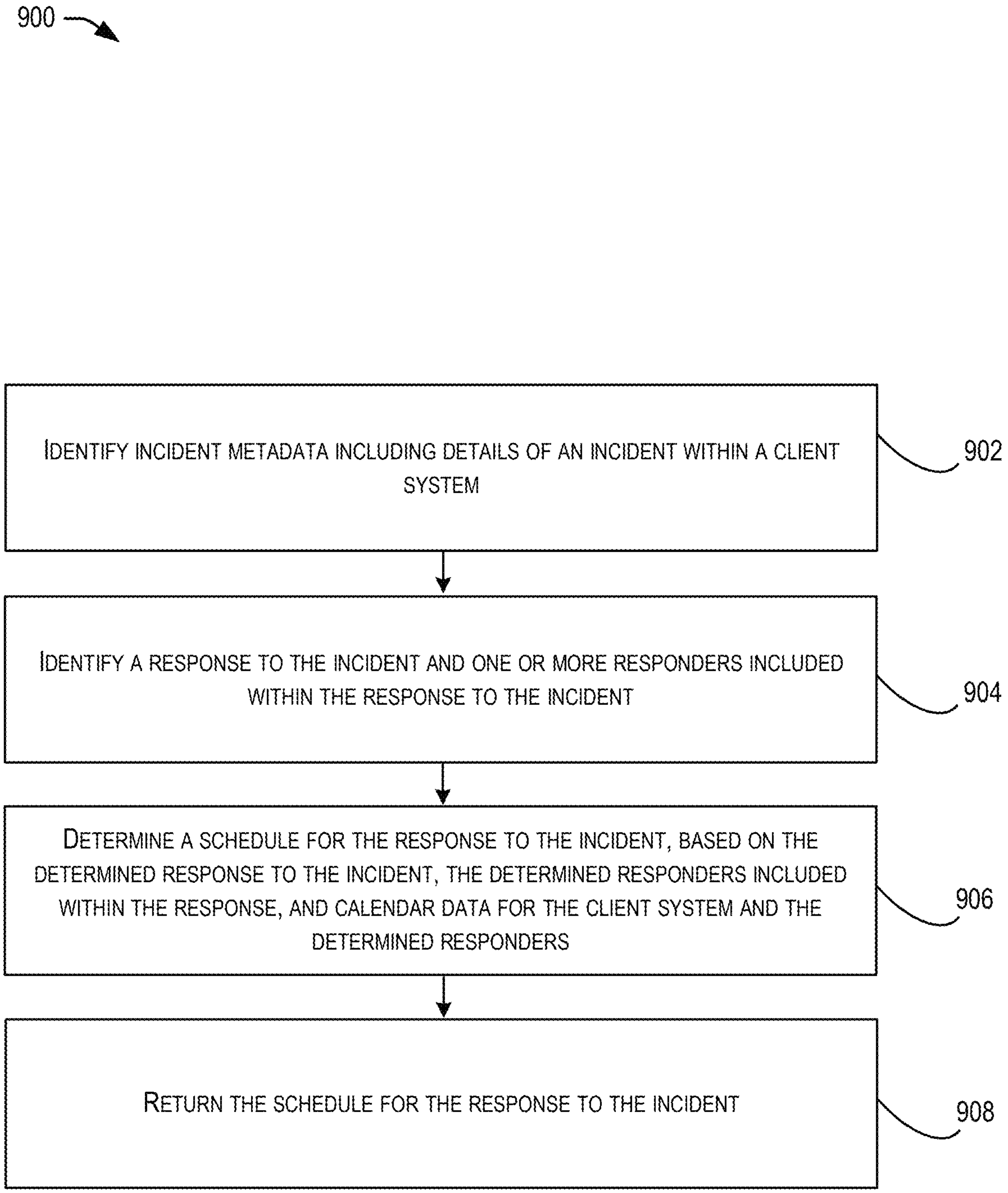
FIG. 9 illustrates an example method for performing dynamic calendar scheduling to respond to an incident, where the query includes a result threshold, according to at least one implementation.

Furthermore, the incident metadata 110 and the determined response and responders 118 are sent to an incident response scheduling system 126 that determines response scheduling data 128 based on these inputs. The response scheduling data 128 may include a schedule for a response to the incident. For example, an exemplary method for determining response scheduling data 128 is shown in FIG. 9. This response scheduling data 128 is then sent to a downstream consumer 130 such as one or more users, one or more applications, a graphical user interface (GUI), etc., and is also sent to a calendaring system 132, where such calendaring system 132 may integrate the response scheduling data 128 into one or more calendars (e.g., calendars of one or more responders to the incident, etc.).

In some environments, a user of an incident identification and response system 106 may install and configure, on computing devices owned and operated by the user, one or more software applications that implement some or all of the components of the incident identification and response system 106. For example, with reference to FIG. 1, a user may install a software application on the alert sources 102 owned by the user and configure each server to operate as one or more components of the incident identification and response system 106. This arrangement generally may be referred to as an "on-premises" solution. That is, the incident identification and response system 106 can be installed and can operate on computing devices directly controlled by the user of the incident identification and response system 106. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of incident identification and response system 106 operate.

In certain implementations, one or more of the components of the incident identification and response system 106 can be implemented in a shared computing resource environment. In this context, a shared computing resource environment or cloud-based service can refer to a service hosted by one more computing resources that are accessible to end users over a network, for example, by using a web browser or other application on a client device to interface with the remote computing resources. For example, a service provider may provide an incident identification and response system 106 by managing computing resources configured to implement various aspects of the system (e.g., the incident identification system 108, the impacted services dependency graph creation system 112, the response determination system 116, the incident impact analysis system 120, the incident response scheduling system 126, other components, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

When implemented in a shared computing resource environment, the underlying hardware (non-limiting examples: processors, hard drives, solid-state memory, RAM, etc.) on which the components of the incident identification and response system 106 execute can be shared by multiple customers or tenants as part of the shared computing resource environment. In addition, when implemented in a shared computing resource environment as a cloud-based service, various components of the incident identification and response system 106 can be implemented using containerization or operating-system-level virtualization, or other virtualization techniques. For example, one or more components of the incident identification system 108, the impacted services dependency graph creation system 112, the response determination system 116, the incident impact analysis system 120, the incident response scheduling system 126, etc. can be implemented as separate software containers or container instances. Each container instance can have certain computing resources (e.g., memory, processor, etc.) of an underlying hosting computing system (e.g., server, microprocessor, etc.) assigned to it, but may share the same operating system and may use the operating system's system call interface. Each container may provide an isolated execution environment on the host system, such as by providing a memory space of the hosting system that is logically isolated from memory space of other containers. Further, each container may run the same or different computer applications concurrently or separately and may interact with each other. Although reference is made herein to containerization and container instances, it will be understood that other virtualization techniques can be used. For example, the components can be implemented using virtual machines using full virtualization or paravirtualization, etc. Thus, where reference is made to "containerized" components, it should be understood that such components may additionally or alternatively be implemented in other isolated execution environments, such as a virtual machine environment.

Implementing the incident identification and response system 106 in a shared computing resource environment can provide a number of benefits. In some cases, implementing the incident identification and response system 106 in a shared computing resource environment can make it easier to install, maintain, and update the components of the incident identification and response system 106. For example, rather than accessing designated hardware at a particular location to install or provide a component of the incident identification and response system 106, a component can be remotely instantiated or updated as desired. Similarly, implementing the incident identification and response system 106 in a shared computing resource environment or as a cloud-based service can make it easier to meet dynamic demand. For example, if the incident identification and response system 106 experiences significant load at indexing or search, additional compute resources can be deployed to process the additional data or queries. In an "on-premises" environment, this type of flexibility and scalability may not be possible or feasible.

In addition, by implementing the incident identification and response system 106 in a shared computing resource environment or as a cloud-based service can improve compute resource utilization. For example, in an on-premises environment if the designated compute resources are not being used by, they may sit idle and unused. In a shared computing resource environment, if the compute resources for a particular component are not being used, they can be re-allocated to other tasks within the incident identification and response system 106 and/or to other systems unrelated to the incident identification and response system 106.

As mentioned, in an on-premises environment, data from one instance of an incident identification and response system 106 is logically and physically separated from the data of another instance of an incident identification and response system 106 by virtue of each instance having its own designated hardware. As such, data from different customers of the incident identification and response system 106 is logically and physically separated from each other. In a shared computing resource environment, components of an incident identification and response system 106 can be configured to process the data from one customer or tenant or from multiple customers or tenants. Even in cases where a separate component of an incident identification and response system 106 is used for each customer, the underlying hardware on which the components of the incident identification and response system 106 are instantiated may still process data from different tenants. Accordingly, in a shared computing resource environment, the data from different tenants may not be physically separated on distinct hardware devices. For example, data from one tenant may reside on the same hard drive as data from another tenant or be processed by the same processor. In such cases, the incident identification and response system 106 can maintain logical separation between tenant data. For example, the incident identification and response system 106 can include separate directories for different tenants and apply different permissions and access controls to access the different directories or to process the data, etc.

In certain cases, the tenant data from different tenants is mutually exclusive and/or independent from each other. For example, in certain cases, Tenant A and Tenant B do not share the same data, similar to the way in which data from a local hard drive of Customer A is mutually exclusive and independent of the data (and not considered part) of a local hard drive of Customer B. While Tenant A and Tenant B may have matching or identical data, each tenant would have a separate copy of the data. For example, with reference again to the local hard drive of Customer A and Customer B example, each hard drive could include the same file. However, each instance of the file would be considered part of the separate hard drive and would be independent of the other file. Thus, one copy of the file would be part of Customer A's hard drive and a separate copy of the file would be part of Customer B's hard drive. In a similar manner, to the extent Tenant A has a file that is identical to a file of Tenant B, each tenant would have a distinct and independent copy of the file stored in different locations on a data store or on different data stores.

Further, in certain cases, the incident identification and response system 106 can maintain the mutual exclusivity and/or independence between tenant data even as the tenant data is being processed, stored, and searched by the same underlying hardware. In certain cases, to maintain the mutual exclusivity and/or independence between the data of different tenants, the incident identification and response system 106 can use tenant identifiers to uniquely identify data associated with different tenants.

In a shared computing resource environment, some components of the incident identification and response system 106 can be instantiated and designated for individual tenants and other components can be shared by multiple tenants. In certain implementations, the incident identification system 108, the impacted services dependency graph creation system 112, the response determination system 116, the incident impact analysis system 120, the incident response scheduling system 126, etc. can be instantiated for each tenant or shared by multiple tenants. In some such implementations where components are shared by multiple tenants, the components can maintain separate directories for the different tenants to ensure their mutual exclusivity and/or independence from each other. Similarly, in some such implementations, the incident identification and response system 106 can use different hosting computing systems or different isolated execution environments to process the data from the different tenants as part of the incident identification system 108, the impacted services dependency graph creation system 112, the response determination system 116, the incident impact analysis system 120, the incident response scheduling system 126, etc.

In some implementations, individual components of the incident identification system 108, the impacted services dependency graph creation system 112, the response determination system 116, the incident impact analysis system 120, the incident response scheduling system 126, etc. may be instantiated for each tenant or shared by multiple tenants. For example, some individual intake system components (e.g., forwarders, output ingestion buffer) may be instantiated and designated for individual tenants, while other intake system components (e.g., a data retrieval subsystem, intake ingestion buffer, and/or streaming data processor), may be shared by multiple tenants.

In some cases, by sharing more components with different tenants, the functioning of the incident identification and response system 106 can be improved. For example, by sharing components across tenants, the incident identification and response system 106 can improve resource utilization, thereby reducing an amount of resources allocated as a whole.

Figure 2:
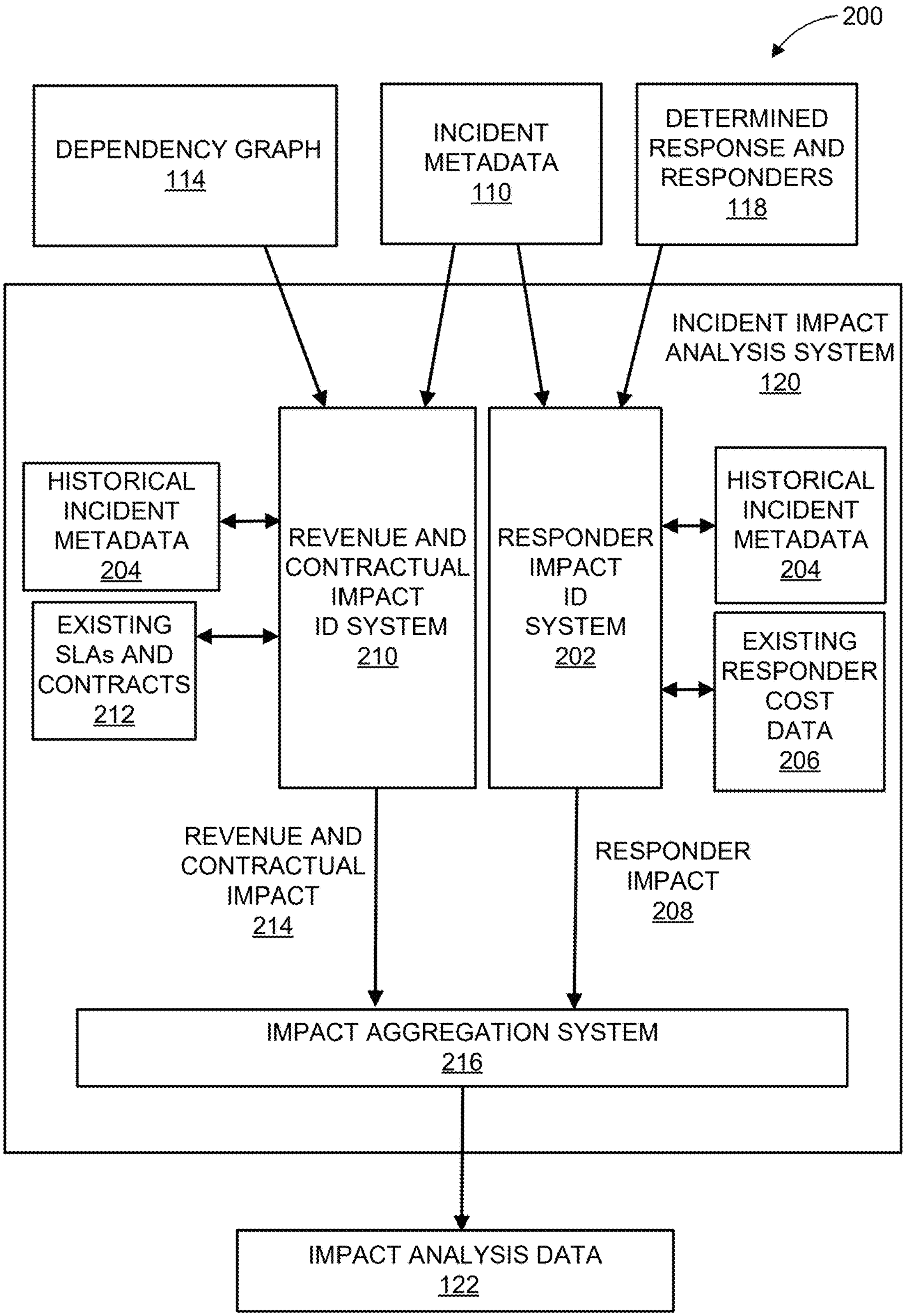
FIG. 2 illustrates exemplary details of the incident impact analysis system of FIG. 1, according to at least one implementation.

FIG. 2 illustrates exemplary details 200 of the incident impact analysis system 120 of FIG. 1, according to one exemplary implementation. As shown, a responder impact identification system 202 receives as input incident metadata 110 and a determined response and responders 118. The responder impact identification system 202 also receives historical incident metadata 204 and existing responder cost data 206. Utilizing this input information, the responder impact identification system 202 calculates and outputs a responder impact 208 for a client system. For example, an exemplary method for determining a responder impact 208 is shown in step 606 of FIG. 6.

Additionally, a revenue and contractual impact identification system 210 receives as input the impacted services dependency graph 114 and incident metadata 110. The revenue and contractual impact identification system 210 also receives historical incident metadata 204 and existing service level agreements (SLAs) and contracts 212. Utilizing this input information, the revenue and contractual impact identification system 210 calculates and outputs a revenue and contractual impact 214 for a client system. For example, an exemplary method for determining a revenue and contractual impact 214 is shown in steps 610-612 of FIG. 6.

Further, an impact aggregation system 216 may obtain both the responder impact 208 and revenue and contractual impact 214 and may create the impact analysis data 122 based on these inputs. In one implementation, the impact analysis data 122 may include a total impact analysis of the incident on a client system. For example, an exemplary method for determining and returning impact analysis data 122 is shown in steps 614-616 of FIG. 6.

Figure 3:
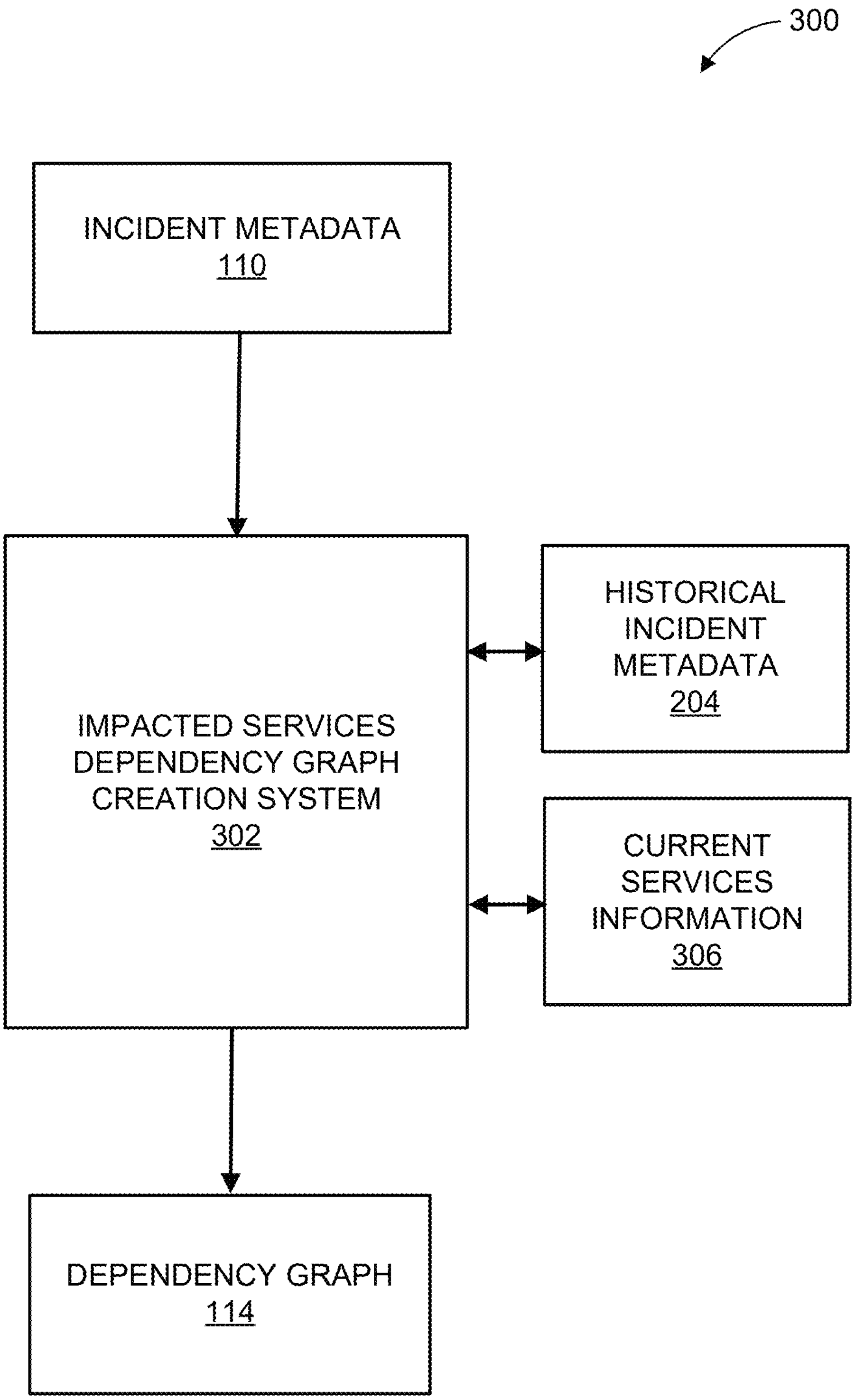
FIG. 3 illustrates exemplary details of the creation of an impacted services dependency graph, according to at least one implementation.

FIG. 3 illustrates exemplary details 300 of the creation of an impacted services dependency graph 114, according to one exemplary implementation. As shown, incident metadata 110 is input into an impacted services dependency graph creation system 302. Historical incident metadata 204 and current services information 306 are also input into the impacted services dependency graph creation system 302. Based on the input information, the impacted services dependency graph creation system 302 creates and outputs an impacted services dependency graph 114. In one implementation, the impacted services dependency graph 114 may include a dependency graph detailing all services within the client system that are impacted by the incident. For example, an exemplary method for creating and outputting an impacted services dependency graph 114 is shown in FIG. 7.

Figure 4:
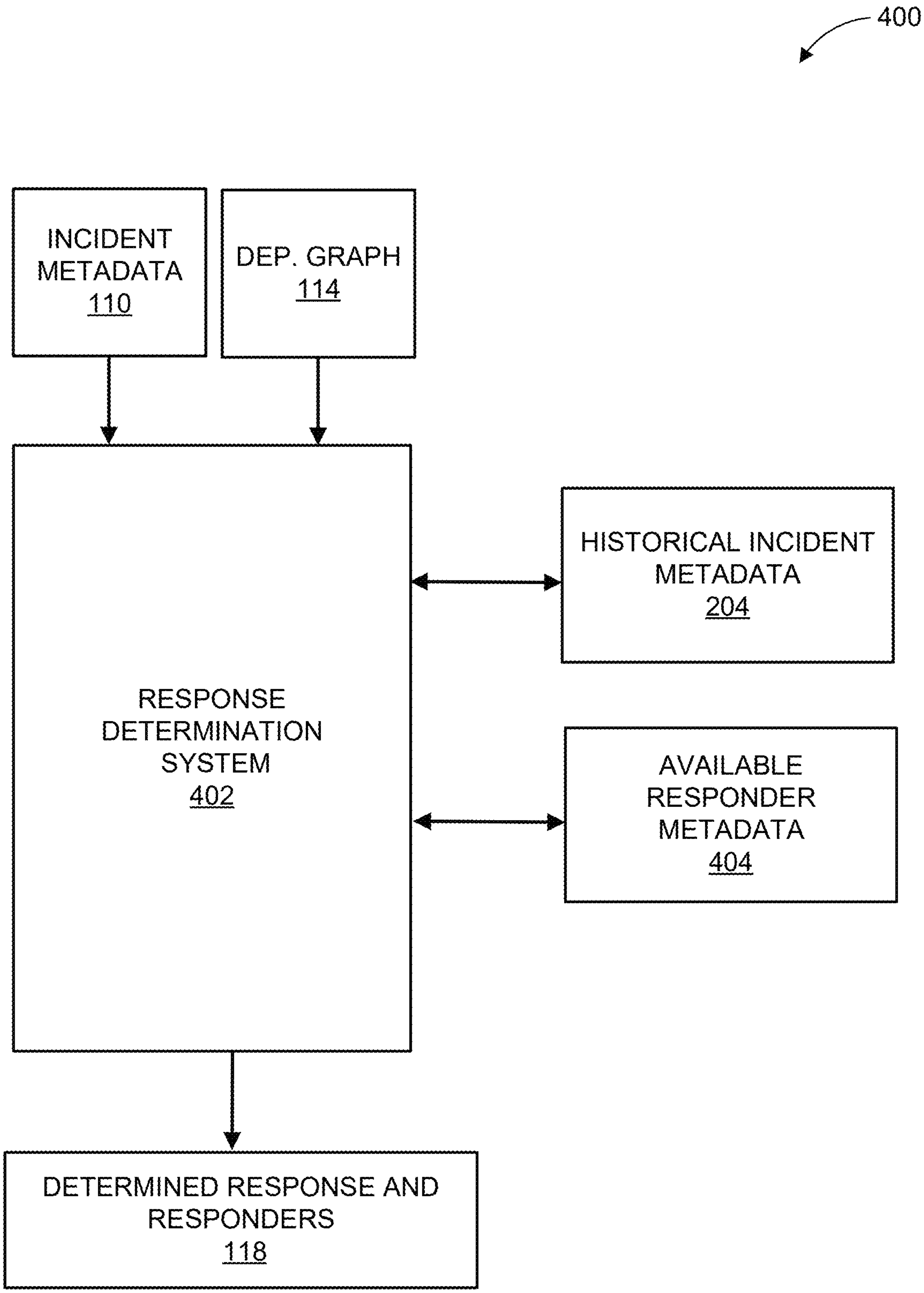
FIG. 4 illustrates exemplary details of the creation of a determined response and responders, according to at least one implementation.

FIG. 4 illustrates exemplary details 400 of the creation of a determined response and responders 118, according to one exemplary implementation. As shown, incident metadata 110 and an impacted services dependency graph 114 are input into a response determination system 402. Historical incident metadata 204 and available responder metadata 404 are also input into the response determination system 402. Based on the input information, the response determination system 402 creates and outputs a determined response and responders 118. In one implementation, the determined response and responders may include a response to the incident and the one or more responders included within the response to the incident. For example, an exemplary method for creating and outputting a determined response and responders 118 is shown in FIG. 8.

Figure 5:
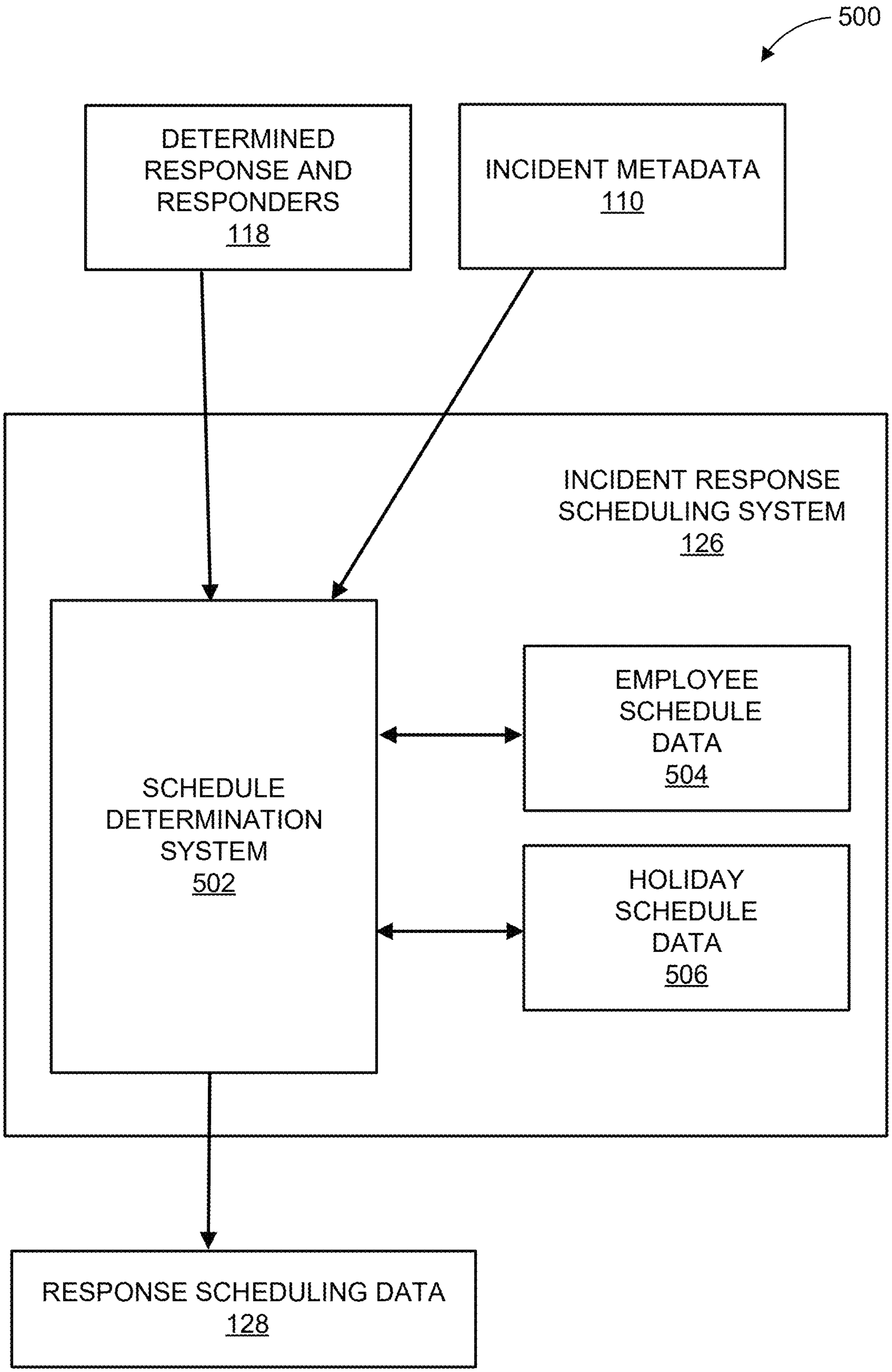
FIG. 5 illustrates exemplary details of the incident response scheduling system of FIG. 1, according to at least one implementation.

FIG. 5 illustrates exemplary details 500 of the incident response scheduling system 126 of FIG. 1, according to one exemplary implementation. As shown, a schedule determination system 502 receives as input incident metadata 110 and a determined response and responders 118. The schedule determination system 502 also receives employee schedule data 504 and holiday schedule data 506. Utilizing this input information, the schedule determination system 502 calculates and outputs response scheduling data 128. In one implementation, the response scheduling data 128 may include a schedule for the response of the incident. For example, an exemplary method for determining and outputting response scheduling data 128 is shown in FIG. 9.

FIG. 6 illustrates an example method 600 for determining an impact of an incident, according to at least one implementation. The method 600 may be performed by one or more components of FIGS. 1-5 and 12. A computer-readable storage medium comprising computer-readable instructions that, upon execution by one or more processors of a computing device, cause the computing device to perform the method 600. The method 600 may be performed in any suitable order. It should be appreciated that the method 600 may include a greater number or a lesser number of steps than that depicted in FIG. 6.

The method 600 may begin at 602, where incident metadata is identified, the incident metadata including details of an incident within a client system. In one implementation, the incident metadata may be generated in response to one or more alerts received from one or more alert sources. In another implementation, the alert sources may each include a device such as a client computing device, storage device, networking device, etc., one or more instances of software, one or more virtualized components (such as a container, etc.), etc.

Additionally, in one implementation, an occurrence of an incident may be identified in response to receiving the one or more alerts from the one or more alert sources. For example, an agent may be installed on each of the one or more alert sources. In another example, each agent may monitor one or more components of the alert source (such as a processor, a memory, a communications network component, etc.). In yet another example, the agent may monitor one or more software components of the alert source (e.g., a virtual machine, a container, etc.). In still another example, the agent may monitor one or more environmental components (e.g., one or more sensors, etc.). In still yet another example, the agent may monitor one or more specific characteristics of the alert source (e.g., CPU usage, bandwidth usage, storage usage, component temperature, error generation by one or more components of the device, etc.).

Further, in one implementation, one or more alerts may be received from the one or more alert sources at a destination system (such as the incident identification and response system 106 of FIG. 1, etc.). In another implementation, the one or more alerts may be analyzed by the destination system to determine that an incident has occurred.

For example, a plurality of incidents may be stored, where each of the plurality of incidents includes metadata including one or more historical alerts associated with the incident. In another example, the one or more current alerts may be compared to one or more historical alerts to determine one or more matching historical alerts. In yet another example, an incident that includes a predetermined number of historical alerts that match the current one or more alerts may be determined as an incident currently occurring. In still another example, a machine learning (ML) system (such as a neural network, etc.) may be trained with training data including historical alerts and corresponding labeled incidents. For instance, the ML system may be trained to output a determination of an incident (and incident metadata describing one or more details of the incident) in response to receiving one or more historical alerts as input. In another example, the trained ML system may take the one or more current alerts as input and may output an indication of the incident as well as incident metadata describing one or more details of the incident.

Further still, in one implementation, the incident metadata may include one or more details of the incident. For example, the incident metadata may include a location of the incident, a start date/time of the incident, one or more components/resources of the client system that are involved and/or impacted by the incident, etc. In another example, all or part of the incident metadata may be extracted from alert metadata.

Also, at 604, one or more responders selected to respond to the incident are identified. In one implementation, a response determination system (such as the response determination system 116 of FIG. 1) may determine one or more responders to respond to the incident. For example, the determined responders may be received from the response determination system 116 (e.g., at an incident impact analysis system 120 of FIG. 1, etc.).

In addition, in one implementation, the one or more responders may be determined based on the incident metadata, a dependency graph (such as a dependency graph 114 of FIG. 1 created by an impacted services dependency graph creation system 112 of FIG. 1), etc. An example method for determining the one or more responders is shown in FIG. 8.

Furthermore, at 606, a responder impact is calculated for the client system utilizing the incident metadata, the one or more responders, historical responder impact data, and existing responder cost data. In one implementation, the responder impact may include a financial cost incurred by the one or more responders selected to respond to the incident. In another implementation, the incident metadata and identified responders may be compared to historical incident metadata and responders to determine an estimated time for each of the responders to respond and resolve the incident within the client system.

For example, the incident metadata and identified responders may be compared to historical incident metadata describing historical incidents within the client system, as well as historical identified responders. In another example, the historical incident metadata may include a location of the historical incident, a start date/time of the historical incident, one or more components/resources of the client system that are involved and/or impacted by the historical incident, etc. In yet another example, the historical incident metadata may also include an amount of time spent by responders to resolve the historical incident, a cost of each of the responders to respond to/resolve the historical incident, etc.

Further still, in one example, a matching historical event may be determined that has an amount of historical incident metadata matching the current incident metadata that exceeds a threshold (or a highest amount of matching metadata amongst all historical events. In another example, the matching historical event may be analyzed to determine an amount of time taken by each responder to respond and resolve the historical incident within the client system. For instance, this time may be used to estimate a time for each of the responders to respond and resolve the incident within the client system.

Also, in one implementation, an ML system may be trained with training data including historical incident metadata and responders, as well as corresponding labeled times needed for each responder to respond and resolve historical incidents. For example, the ML system may be trained to output a time needed for each responder to respond to and resolve an incident in response to receiving incident metadata and responders as input. In another example, the trained ML system may take the current incident metadata and responders as input and may output an indication of a time needed for each responder to respond to and resolve the current incident.

Additionally, in one implementation, the responder impact for the client system may be determined utilizing the selected responders, the time needed for each responder to respond to and resolve the current incident, and existing responder cost data. For example, the existing responder cost data may include an indication of a cost of the responder. In another example, the cost may be indicated as an hourly rate, an annual salary, or any other level of granularity.

Further, in one example, for each responder, the amount of time needed for the responder to respond to and resolve the current incident may be indicated as a certain number of units of time (e.g., hours, days, etc.). In another example, for each responder, the responder cost for the responder may be determined for these units of time (e.g., an hourly rate, etc.) and may be multiplied by the number of units to determine a total cost for each responder. In yet another example, the total cost for all responders may be summed to determine the responder impact for the client system.

Further still, at 608, a dependency graph is identified that details services within the client system that are impacted by the incident. In one implementation, an impacted services dependency graph creation system (such as the impacted services dependency graph creation system 112 of FIG. 1) may determine a dependency graph 114 detailing services within the client system that are impacted by the incident. For example, the dependency graph may be received from the impacted services dependency graph creation system 112 (e.g., at an incident impact analysis system 120 of FIG. 1, etc.).

Also, in one implementation, the dependency graph may be determined based on the incident metadata, historical services dependency data, current services information, etc. In another implementation, an example method for determining the one or more responders is shown in FIG. 7.

In addition, at 610, a contractual impact of the incident on the client system is calculated utilizing the incident metadata, the dependency graph, and one or more existing contracts associated with the client system. In one implementation, the dependency graph may be used to identify all services within the client system that are impacted (e.g., interrupted, unavailable, etc.). In another implementation, the incident metadata may be compared to historical metadata to determine historical metadata that matches the current incident metadata. For example, historical time periods for which each of one or more identified services were impacted may be identified that correspond to the matching historical metadata. In another example, these historical time periods may be used to determine an estimated duration of impact for each of the services within the client system that are impacted by the incident.

Furthermore, in one implementation, the one or more existing contracts may include one or more service contracts, one or more service level agreements (SLAs), etc. In another implementation, the impacted services, and the estimated duration that each of the services are impacted, may be compared to the one or more existing contracts to determine if one or more contract violations (e.g., SLA violations, etc.) have occurred. In yet another implementation, in response to determining that one or more contract violations have occurred, one or more monetary penalties associated with the one or more contract violations may be determined. In still another implementation, these monetary penalties may be summed to determine a total monetary penalty for the client system as a result of the incident. The contractual impact may include the total monetary penalty.

Further still, at 612, a revenue impact of the incident on the client system is calculated utilizing the incident metadata, the dependency graph, and historical impact data for the client system. In one implementation, the dependency graph may be used to identify all services within the client system that are impacted (e.g., interrupted, unavailable, etc.). In another implementation, the incident metadata may be compared to historical metadata to determine historical metadata that matches the current incident metadata. For example, historical costs of impacted services may be identified that correspond to the matching historical metadata. In another example, these historical costs may be used to determine an estimated cost of impact for each of the services within the client system that are impacted by the incident.

Also, in one implementation, a predetermined cost may be defined for a service for a predetermined period of time. For example, the estimated duration of impact for each of the services within the client system that are impacted by the incident may be multiplied by the predetermined cost for each respective service to determine a total cost of the incident for each service. In another implementation, the revenue impact may include this estimated cost of impact.

Additionally, at 614, a total impact analysis of the incident on the client system is determined utilizing the responder impact, the contractual impact, and the revenue impact. In one implementation, the total impact analysis may include a total impact amount indicating a sum of monetary costs of the responder impact, the contractual impact, and the revenue impact. In another implementation, the total impact analysis may include an indication of all responders to the incident. In yet another implementation, the total impact analysis may include an indication of an amount of time necessary to respond to the incident, an amount of time necessary to resolve the incident, etc.

Further, at 616, the total impact analysis of the incident on the client system is returned. In one implementation, the total impact analysis may be presented to one or more users utilizing a graphical user interface (GUI). In another implementation, the total impact analysis may be presented utilizing one or more graphs, charts, etc. In yet another implementation, the total impact analysis may be presented to one or more applications (e.g., via an application program interface (API), etc.).

Further still, in one implementation, the total impact analysis for the incident may be compared to total impact analyses generated for one or more additional incidents. For example, the incidents may be ranked according to total impact amounts and may be automatically scheduled to be resolved according to this ranking. In another example, an incident with a larger total impact amount may be automatically resolved before an incident with a smaller total impact amount. Resolving the incident may include automatically performing one or more actions at the client system (e.g., updating software, deleting software, rebooting one or more systems, etc.), automatically scheduling the one or more responders to respond to the incident (e.g., by automatically updating one or more employee calendars utilizing a calendaring system 132 of FIG. 1, etc.), In this way, insights into an impact of an incident within a client system may be quickly and automatically determined and provided. By prioritizing the resolution of incidents with a greater impact over incidents with a lesser impact, a performance of the client system (including a performance of hardware implemented within the client system may be improved).

FIG. 7 illustrates an example method 700 for determining a dependency graph indicating services directly or indirectly impacted by an incident, according to at least one implementation. The method 700 may be performed by one or more components of FIGS. 1-5 and 12. A computer-readable storage medium comprising computer-readable instructions that, upon execution by one or more processors of a computing device, cause the computing device to perform the method 700. The method 700 may be performed in any suitable order. It should be appreciated that the method 700 may include a greater number or a lesser number of steps than that depicted in FIG. 7.

The method 700 may begin at 702, where incident metadata is identified, the incident metadata including details of an incident within a client system. An exemplary description of the incident metadata is shown in step 602 of FIG. 6. Additionally, at 704, a dependency graph detailing all services within the client system that are impacted by the incident is constructed utilizing the incident metadata, historical incident metadata, and current services information within the client system.

Additionally, in one implementation, the dependency graph may illustrate (e.g., via a graph that includes one or more directed nodes) a first service impacted by the incident, as well as additional services that are directly or indirectly impacted the incident within the client system. In another implementation, a first service within the client system that is impacted by the incident may be determined utilizing the incident metadata. For example, the first service may include a source of the incident. In another example, the incident metadata may include an indication of a first service impacted by the incident. In yet another example, the incident metadata may include an indication of a source of the incident, one or more entities (such as images, containers, etc.) impacted by the incident, etc.

Further, in one implementation, the incident metadata may be compared to historical incident metadata (e.g., metadata from historical incidents) to find one or more matching historical incidents that share a predetermined amount of incident metadata with the current incident. In another implementation, the one or more matching historical incidents may be analyzed to identify a first service impacted within the matching historical incidents, as well as one or more additional services that were directly or indirectly impacted by the matching historical incidents.

Further still, in one implementation, current services information within the client system may indicate interrelationships between current services within the client system. For example, these interrelationships may include dependencies between services, etc. In another implementation, the first service within the client system that is impacted by the incident may be identified within the current services information. For example, interrelationships between the first service and one or more additional services may be identified. Also, one or more additional services may be dependent upon the first service and may be directly or indirectly impacted by the first service.

Also, in one implementation, the first service, and an indication of all additional services identified as being directly or indirectly impacted by the first service, may be used to construct the dependency graph for the current incident. In another implementation, a machine learning environment may be trained utilizing input including historical incident metadata and labeled output including services within the client system that were directly and indirectly impacted by the historical incident. For example, the output may be configured as a dependency graph.

In addition, in one implementation, the metadata of the current incident may be input into the trained machine learning environment. In another implementation, the trained machine learning environment may then output all services within the system that are impacted by the current incident. For example, the output may include the dependency graph.

Furthermore, at 706, the dependency graph is returned. In one implementation, the dependency graph may be sent to a response determination system (such as the response determination system 116 of FIG. 1) and may be used to determine a response and responders to the incident. In another implementation, the dependency graph may be sent to an incident impact analysis system (such as the incident impact analysis system 120 of FIG. 1) and may be used to determine impact analysis data.

FIG. 8 illustrates an example method 800 for determining a response to an incident and one or more responders included within the response, according to at least one implementation. The method 800 may be performed by one or more components of FIGS. 1-5 and 12. A computer-readable storage medium comprising computer-readable instructions that, upon execution by one or more processors of a computing device, cause the computing device to perform the method 800. The method 800 may be performed in any suitable order. It should be appreciated that the method 800 may include a greater number or a lesser number of steps than that depicted in FIG. 8.

The method 800 may begin at 802, where incident metadata is identified, the incident metadata including details of an incident within a client system. An exemplary description of the incident metadata is shown in step 602 of FIG. 6. Additionally, at 804, a response to the incident and one or more responders included within the response to the incident are determined based on the incident metadata, historical incident metadata, and available responder metadata. In one implementation, the responders may include employees of a company implementing and/or maintaining the client system. In another implementation, the incident metadata may be compared to historical incident metadata (e.g., metadata from historical incidents) to find one or more matching historical incidents that share a predetermined amount of incident metadata with the current incident.

Additionally, in one implementation, each of the one or more matching historical incidents may be analyzed to identify a response to the historical incident, a time taken to implement the response, and one or more responders included within the response to the historical incident. For example, this information may be stored as historical incident metadata for the historical incidents.

Further, in one implementation, a response to an incident may include one or more actions performed to resolve the incident, an order in which the one or more actions are to be performed, an amount of time needed to resolve the incident, etc. For example, the one or more actions may include debugging application code, replacing or repairing one or more hardware components, installing one or more updates, etc. In another implementation, one or more responders included within a response to an incident may include individuals assigned to resolve the incident within the client system (e.g., by performing the one or more actions necessary to resolve the incident).

Further still, in one implementation, the response to the current incident may be determined based on the responses taken to resolve each of the one or more matching historical incidents. In another implementation, the one or more responders included within the response to the matching historical incidents may be cross-referenced with available responder metadata to identify individuals to respond to the current incident. For example, the available responder metadata may include identifiers (such as user IDs) of current employees within the client system, calendar information (such as daily availability) for those employees, one or more skills for each of the current employees, etc. In another example, user IDs of responders included within the response to the matching historical incidents may be compared to all user IDs of current employees within the client system to identify current employees who previously responded to matching historical incidents. These identified current employees may be selected as one or more responders.

Also, in one implementation, each of the one or more matching historical incidents may be analyzed to identify a skill set of each responder to the matching historical incidents. In another implementation, the skill set of each responder to the matching historical incidents may be cross-referenced with available responder metadata to identify responders having matching skill sets. For example, the available responder metadata may include skill sets (such as lists of predetermined skills) possessed by each of the current employees within the client system. In another example, skill sets of responders included within the response to the matching historical incidents may be compared to all skill sets of current employees within the client system to identify current employees having skill sets matching the skill sets of historical responders. In yet another example, these identified current employees may be selected as one or more responders.

In addition, in one implementation, an amount of time needed to respond to the current incident, as well as start and completion times for each responder, may be determined. For example, the incident may be compared to historic incidents to determine one or more matching historic incidents. In another example, an amount of time needed to address/resolve the matching historic incidents may be averaged to determine the amount of time needed to address the current incident. In yet another example, start and completion times for each responder to matching historic incidents may be used to estimate start and completion times for corresponding responders to the current incident.

In one example, a machine learning environment may be trained utilizing input including historical incident metadata and labeled output including an amount of time needed to address the historical incident and start and completion times for each responder to the historical incident. In another example, the incident metadata of the current incident may be input into the trained machine learning environment. In yet another example, the trained machine learning environment may then output the amount of time needed to address the current incident as well as start and completion times for each responder to the current incident.

Furthermore, in one implementation, a resolution window for resolving the current incident within the client system may be determined for each responder utilizing the determined amount of time needed to respond to the current incident and the start and completion times for each responder. In another implementation, calendar information for selected responders may be compared to the resolution window for the responders to determine responders with conflicting calendar information. For example, conflicting calendar information may include calendar unavailability for a responder during one or more portions of the resolution window.

Further still, in one implementation, substitutes (such as employees with similar skill sets) may be determined for responders with conflicting calendar information. In another implementation, a machine learning environment may be trained utilizing input including historical incident metadata and historical available responder metadata and labeled output including a response to the historical incident and responders to the historical incident. In another implementation, the incident metadata of the current incident and current available responder metadata may be input into the trained machine learning environment. In yet another implementation, the trained machine learning environment may then output a response to the current incident and responders to the current incident.

Also, in one implementation, individuals may be included within teams that are predetermined to respond to predetermined services within the system. For example, the system that is affected by the incident may be identified, and one or more teams designated to respond for that system (as well as the individuals within the one or more teams) may be determined. In another implementation, a machine learning environment may be trained utilizing input including incident metadata and labeled output including individuals and/or teams within the system that were assigned to resolve the incident.

Additionally, the metadata of the current incident may be input into the trained machine learning environment, which may then output individuals and/or teams within the system to be assigned to resolve the current incident, and a knowledge graph may be derived that illustrates how individuals, teams, and services are related to incidents and alerts. The knowledge graph may be constructed based on historical events and associated teams. In one implementation, a machine learning environment may be trained utilizing input including a knowledge graph and incident metadata and labeled output including individuals and/or teams within the system that were assigned to resolve the incident. The metadata of the current incident as well as the knowledge graph may be input into the trained machine learning environment, which may then output individuals and/or teams within the system to be assigned to resolve the current incident.

Further, at 806, the response to the incident and the one or more responders included within the response to the incident are returned. In one implementation, the response to the incident and the one or more responders included within the response may be sent to an incident response scheduling system (such as the incident response scheduling system 126 of FIG. 1) and may be used to determine response scheduling data. In another implementation, the response to the incident and the one or more responders included within the response may be sent to an incident impact analysis system (such as the incident impact analysis system 120 of FIG. 1), and may be used to determine impact analysis data.

FIG. 9 illustrates an example method 900 for performing dynamic calendar scheduling to respond to an incident, according to at least one implementation. The method 900 may be performed by one or more components of FIGS. 1-5 and 12. A computer-readable storage medium comprising computer-readable instructions that, upon execution by one or more processors of a computing device, cause the computing device to perform the method 900. The method 900 may be performed in any suitable order. It should be appreciated that the method 900 may include a greater number or a lesser number of steps than that depicted in FIG. 9.

The method 900 may begin at 902, where incident metadata is identified, the incident metadata including details of an incident within a client system. An exemplary description of the incident metadata is shown in step 602 of FIG. 6. Additionally, at 904, a response to the incident and one or more responders included within the response to the incident are identified. In one implementation, the response to the incident and the one or more responders included within the response may be received from a response determination system (such as the response determination system 116 of FIG. 1, etc.)

Further, at 906, a schedule for the response to the incident is determined based on the determined response to the incident, the determined responders included within the response, and calendar data for the client system and the determined responders. In one implementation, calendar data for the client system may include holiday schedule data (such as the holiday schedule data 506 of FIG. 5, etc.) that indicates one or more calendar dates determined to be holidays. In another implementation, calendar data for determined responders may include employee schedule data (such as the employee schedule data 540 of FIG. 4, etc.) that indicates a current schedule of all employees of the business implementing and maintaining the client system.

For example, the current schedule for an employee may indicate a current availability of the employee for a predetermined time period. In another example, calendar data may be stored at and retrieved from one or more calendar applications.

Further still, in one implementation, a schedule for the response to the incident may be determined that satisfies all limitations within the calendar data for the client system and the calendar data for the determined responders. In another implementation, the schedule for the response to the incident may indicate a start and end time for the response to the incident, start and end times for each of the determined responders included within the response, etc. For example, the start and end times for each of the determined responders included within the response may overlap (e.g., one responder may start responding to the incident before another responder has finished responding to the incident, etc.).

Also, at 908, the schedule for the response to the incident is returned. The schedule may include the response scheduling data 128 of FIG. 1. In one implementation, the schedule for the response to the incident may be sent to one or more downstream consumers (such as the downstream consumer 130 of FIG. 1). In another implementation, the schedule for the response to the incident may be implemented by integrating the schedule within one or more calendaring systems (such as the calendaring system 132 of FIG. 1).

Figure 10:
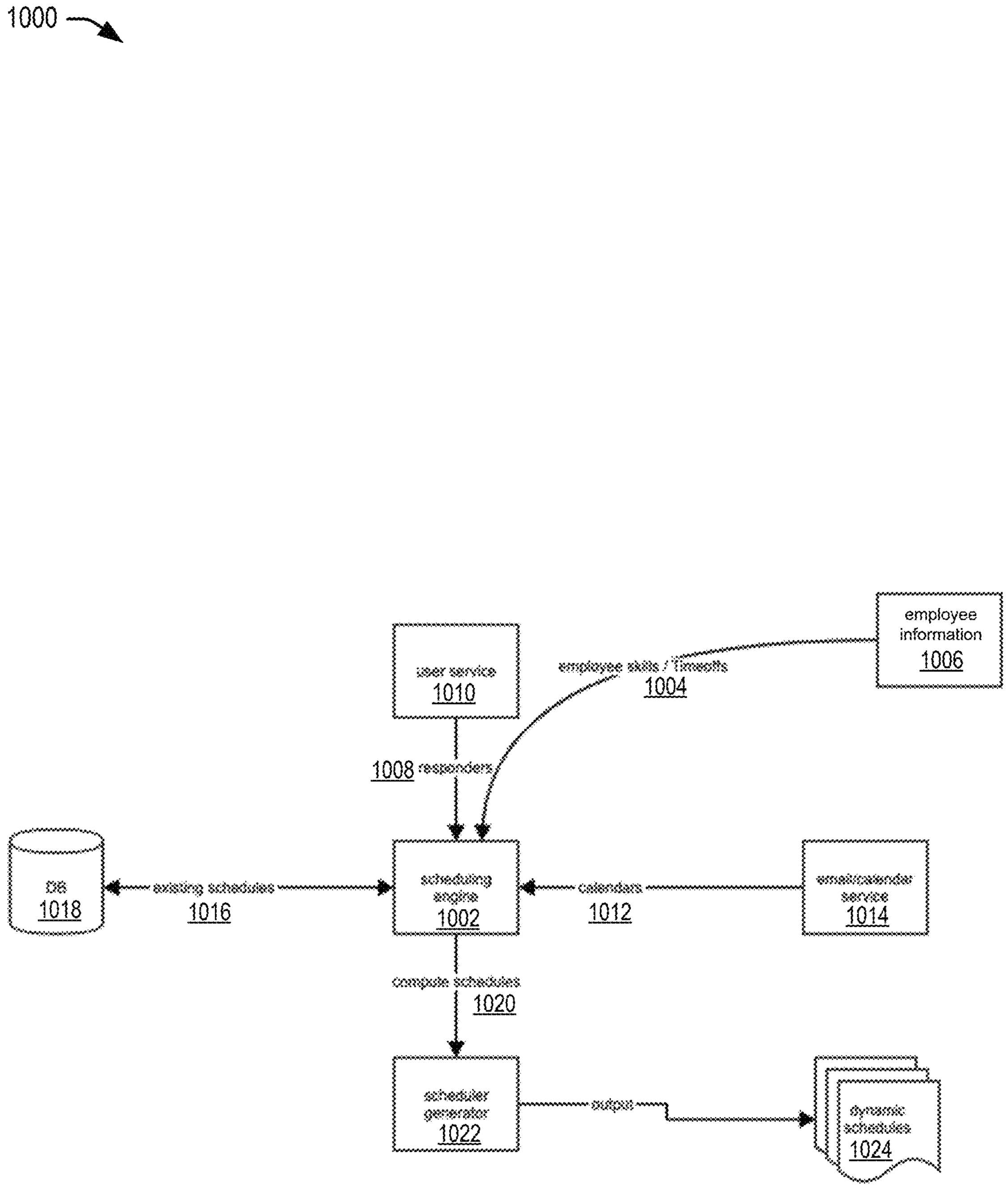
FIG. 10 illustrates an exemplary scheduling engine workflow, where the query includes a result threshold, according to at least one implementation.

FIG. 10 illustrates an exemplary scheduling engine workflow 1000, according to one implementation. As shown, a scheduling engine 1002 retrieves employee skills and times off 1004 from an employee information store 1006. Additionally, the scheduling engine 1002 retrieves a list of available responders 1008 from a user service 1010. The scheduling engine 1002 also retrieves calendar information 1012 from an email/calendar service 1014, and retrieves existing schedule information 1016 from a database 1018. Based on the retrieved information, the schedule engine 1002 requests the computation of schedules 1020 from a schedule generator 1022. The schedule generator 1022 then outputs dynamic schedules 1024 for the responders.

Figure 11:
FIG. 11 illustrates an exemplary scheduling engine interface display, according to at least one implementation.

FIG. 11 illustrates an exemplary scheduling engine interface display 1100, according to one implementation. As shown, generated schedules are displayed according to schedule name 1102 and confidence level 1104.

Figure 12:
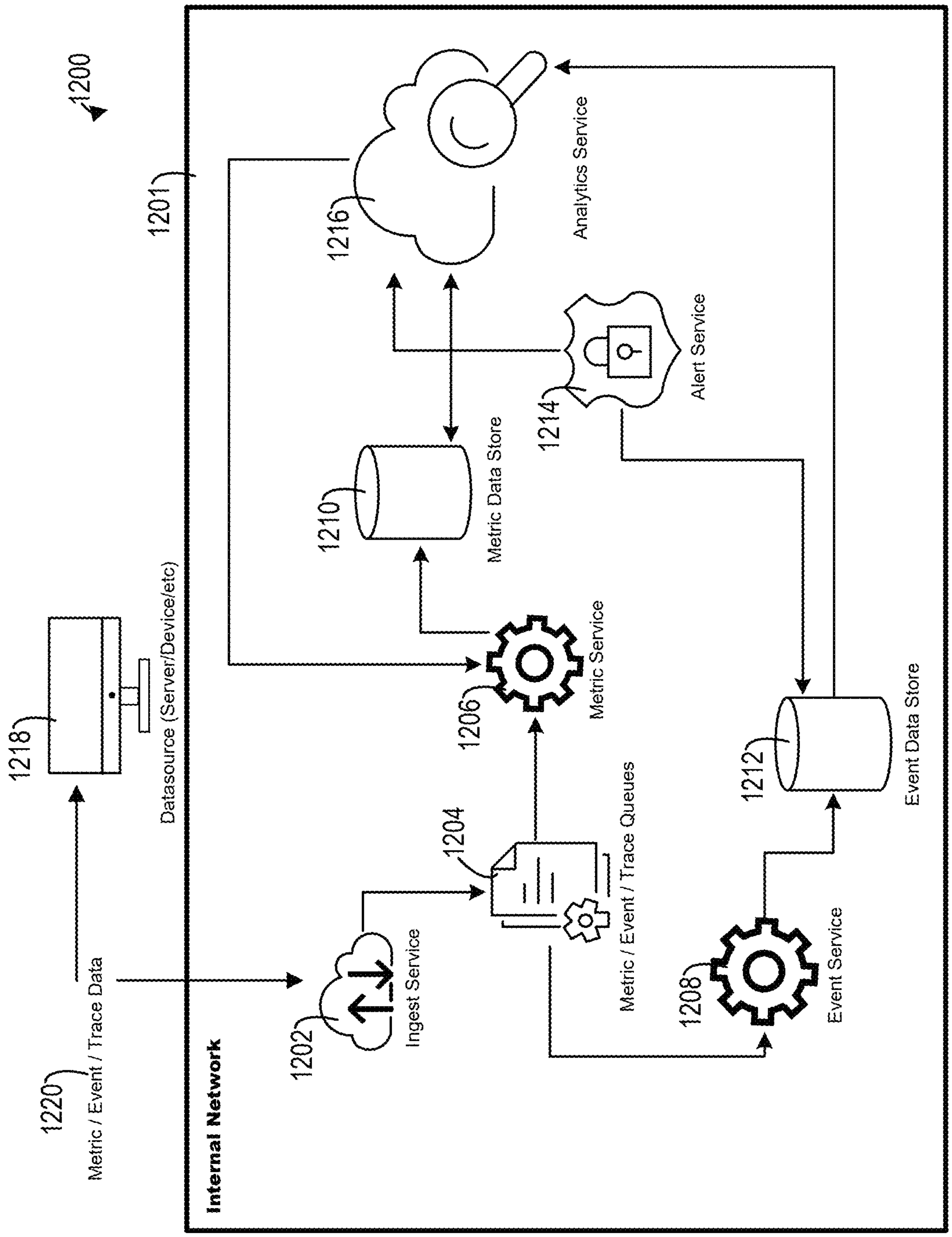
FIG. 12 is a block diagram of an observability environment, according to at least one implementation.

FIG. 12 is a block diagram of an implementation of an observability environment 1200. In the illustrated implementation, the observability environment 1200 includes an observability system 1201 with an ingest service 1202, a metric/event/trace data queue 1204, a metric service 1206, an event service 1208, a metric data store 1210 and an event data store 1212, an alert service 1214, and an analytics service 1216.

The ingest service 1202, the metric/event/trace data queue 1204, the metric service 1206, the event service 1208, the metric data store 1210 and the event data store 1212, the alert service 1214, and the analytics service 1216 can communicate with each other via one or more internal networks (e.g., networks internal to the observability system 1201), such as a local area network (LAN), wide area network (WAN), private or personal network, cellular networks, intranetworks, and/or internetworks using any of wired, wireless, terrestrial microwave, satellite links, etc., and may include the Internet. Although not explicitly shown in FIG. 12, it will be understood that a data source 1218 can communicate with the observability system 1201 via one or more networks.

In some implementations, metric/event/trace data 1220 may be received from a data source 1218 via the ingest service 1202. For example, one or more monitoring agents may be deployed within the data source 1218, where such monitoring agents identify, retrieve, and/or compile the metric/event/trace data 1220. In another example, the metric/event/trace data 1220 may be sent from the data source 1218 (e.g., by one or more monitoring agents within the data source 1218) to the ingest service 1202, utilizing an application programming interface (API) installed within the observability system 1201.

Additionally, after being received by the ingest service 1202, the metric/event/trace data 1220 may be stored in a metric/event/trace data queue 1204. The metric/event/trace data queue 1204 may include one or more hardware storage components used to store the metric/event/trace data 1220. The metric/event/trace data queue 1204 may implement one or more predetermined storage methods (such as a first in, first out (FIFO) storage method, etc.).

Further, the metric/event/trace data 1220 may be sent from the metric/event/trace data queue 1204 to the metric service 1206 for processing. In some implementations, the metric service 1206 may create one or more time series metrics, utilizing the metric/event/trace data 1220. These time series metrics may be stored in the metric data store 1210. Further still, the metric/event/trace data 1220 may be sent from the metric/event/trace data queue 1204 to the event service 1208 for processing. In some implementations, the event service 1208 may create one or more events, utilizing the metric/event/trace data 1220. These events may be stored in the event data store 1212.

Also, the analytics service 1216 may retrieve time series metrics from the metric data store 1210, and may retrieve events from the event data store 1212. In some implementations, the time series metrics and the events may be retrieved by the analytics service 1216 utilizing one or more mathematical functions, one or more filtering functions, etc. These time series metrics and events may be processed by the analytics service 1216 to produce result data. This result data may be stored, used to create visualization data for display, etc.

In addition, the alert service 1214 may retrieve the result data from the analytics service 1216. The alert service may compare this result data against one or more alerting rules to determine one or more matches. If match criteria are determined (e.g., one or more matches with the result data are determined, the result data exceeds one or more thresholds, etc.), the alert service 1214 may create one or more events that are sent to one or more entities (e.g., users, etc.), stored in the event data store 1212, etc.

In this way, the observability system 1201 may retrieve, sort, and analyze input metric/event/trace data 1220. Results of the analysis may include alerts that are presented to one or more users as well as visualization data that may be presented via one or more displays.

Computer programs typically comprise one or more instructions set at various times in various memory devices of a computing device, which, when read and executed by at least one processor, will cause a computing device to execute functions involving the disclosed techniques. In some implementations, a carrier containing the aforementioned computer program product is provided. The carrier is one of an electronic signal, an optical signal, a radio signal, or a non-transitory computer-readable storage medium.

Any or all of the features and functions described above can be combined with each other, except to the extent it may be otherwise stated above or to the extent that any such implementations may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective implementations may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Conditional language, such as, among others, "can," "could," "might," or "may," unless specifically stated otherwise, or otherwise understood within the context as used, is generally intended to convey that certain implementations include, while other implementations do not include, certain features, elements and/or steps. Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation. Furthermore, use of "e.g.," is to be interpreted as providing a non-limiting example and does not imply that two things are identical or necessarily equate to each other.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is understood with the context as used in general to convey that an item, term, etc. may be either X, Y or Z, or any combination thereof. Thus, such conjunctive language is not generally intended to imply that certain implementations require at least one of X, at least one of Y and at least one of Z to each be present. Further, use of the phrase "at least one of X, Y or Z" as used in general is to convey that an item, term, etc. may be either X, Y or Z, or any combination thereof.

In some implementations, certain operations, acts, events, or functions of any of the algorithms described herein can be performed in a different sequence, can be added, merged, or left out altogether (e.g., not all are necessary for the practice of the algorithms). In certain implementations, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some implementations the connections between the components shown represent possible paths of data flow, rather than actual connections between hardware. While some examples of possible connections are shown, any of the subset of the components shown can communicate with any other subset of components in various implementations.

Implementations are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such implementations may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective implementations may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some implementations the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some implementations, certain operations, acts, events, or functions of any of the algorithms described herein can be performed in a different sequence, can be added, merged, or left out altogether (e.g., not all are necessary for the practice of the algorithms). In certain implementations, operations, acts, functions, or events can be performed concurrently, e.g., through multi-threaded processing, interrupt processing, or multiple processors or processor cores or on other parallel architectures, rather than sequentially.

What is claimed is:

1. A computer-implemented method, comprising:
- receiving and processing, at one or more computing systems, data in real time transmitted from components deployed within a distributed computing environment, wherein the components include hardware components, and software components, wherein the software components include a plurality of services executing on one or more processors within the distributed computing environment;
- receiving, at the one or more computing systems, application data associated with one or more distributed applications that execute within the distributed computing environment;
- programmatically generating, based on the application data and the data, a plurality of ingested spans and a plurality of traces, wherein each of the plurality of traces is a collection of actions, or spans, that occur to complete a transaction within the distributed computing environment;
- detecting, by a computer system, an occurrence of an incident within a client system based, at least in part, on a programmatic analysis of the data and the plurality of traces;
- identifying, by the computer system, one or more responders selected to respond to the incident within the client system;
- calculating, by the computer system, a responder impact for the client system utilizing incident metadata including details of the incident within a client system and the one or more responders;
- constructing, by the computer system, a dependency graph detailing services from the plurality of services within the client system that are impacted by the incident by identifying interrelationships and dependencies between the services to analyze the plurality of traces to provide full-fidelity access to the application data;
- determining, by the computer system, an estimated duration of impact for each of the services;
- calculating, by the computer system, a contractual impact of the incident on the client system utilizing the incident metadata, the estimated duration, and the dependency graph;
- calculating, by the computer system, a revenue impact of the incident on the client system utilizing the incident metadata and the dependency graph;
- determining, by the computer system, a total impact analysis of the incident on the client system, utilizing the responder impact, the contractual impact, and the revenue impact;
- comparing, by the computer system, the total impact analysis to total impact analyses generated for one or more additional incidents;
- ranking, by the computer system, the incident and the additional incidents based on the comparing; and
- causing, by the computer system, one or more automated actions to be performed at the client system according to the ranking, wherein the one or more automated actions comprise at least one of updating software, deleting software, or rebooting one or more systems corresponding to the impacted services identified within the dependency graph to resolve the incident.

2. The computer-implemented method of claim 1, further comprising constructing, by the computer system, the dependency graph utilizing the incident metadata, historical incident metadata, and current services information within the client system.

3. The computer-implemented method of claim 1, further comprising:
- inputting, by the computer system, the incident metadata into a trained machine learning environment; and
- receiving, at the computer system from the trained machine learning environment, a determination of an incident, wherein the trained machine learning environment is trained with training data including historical alerts and corresponding labeled incidents comprising services within the client system that were directly and indirectly impacted by historical incidents to configure the dependency graph in response to receiving one or more historical alerts as input.

4. The computer-implemented method of claim 1, further comprising:
- identifying, by the computer system, an occurrence of the incident in response to receiving one or more alerts each indicating a predetermined occurrence within a component of one or more alert sources; and
- generating, by the computer system, the incident metadata in response to identifying the occurrence of the incident.

5. The computer-implemented method of claim 1, wherein the responder impact includes a cost incurred by the one or more responders selected to respond to the incident.

6. The computer-implemented method of claim 1, wherein calculating the contractual impact of the incident on the client system includes:
- identifying, by the computer system, all services within the client system that are directly or indirectly impacted, utilizing the dependency graph; and
- determining, by the computer system, one or more contractual penalties, based on the estimated duration of impact for each of the services and the one or more existing contracts associated with the client system.

7. The computer-implemented method of claim 1, wherein calculating the revenue impact of the incident on the client system includes:
- identifying, by the computer system, all services within the client system that are directly or indirectly impacted, utilizing the dependency graph; and
- determining, by the computer system, one or more revenue penalties, based on the estimated duration of impact for each of the services and predetermined time-based penalties determined for each of the services.

8. The computer-implemented method of claim 1, wherein the total impact analysis includes a total impact amount indicating a sum of costs of the responder impact, the contractual impact, and the revenue impact.

9. The computer-implemented method of claim 1, comprising presenting the total impact analysis utilizing a graphical user interface (GUI).

10. The computer-implemented method of claim 1, further comprising:
automatically resolving, by the computer system, the incident and the additional incidents according to the ranking.

11. A system comprising:
instrumentation configured to monitor in real time, hardware components and software components, wherein the software components include a plurality of services executing within a distributed computing environment;
one or more processors configured to:
receive application data associated with one or more distributed applications that execute within the distributed computing environment;
programmatically generate, based on the application data and the data, a plurality of ingested spans and a plurality of traces, wherein each of the plurality of traces is a collection of actions, or spans, that occur to complete a transaction;
detect an occurrence of an incident within a client system based, at least in part, on a programmatic analysis of the data and the plurality of traces;
identify one or more responders selected to respond to the incident within the client system;
calculate a responder impact for the client system utilizing incident metadata including details of the incident within a client system and the one or more responders;
construct a dependency graph detailing services from the plurality of services within the client system that are impacted by the incident by identifying interrelationships and dependencies between the services to analyze the plurality of traces to provide full-fidelity access to the application data;
determine an estimated duration of impact for each of the services;
calculate a contractual impact of the incident on the client system utilizing the incident metadata, the estimated duration, and the dependency graph;
calculate a revenue impact of the incident on the client system utilizing the incident metadata and the dependency graph;
determine a total impact analysis of the incident on the client system, utilizing the responder impact, the contractual impact, and the revenue impact;
compare the total impact analysis to total impact analyses generated for one or more additional incidents;
rank the incident and the additional incidents based on the comparing; and
perform one or more actions at the client system according to the ranking, wherein the one or more automated actions comprise at least one of updating software, deleting software, or rebooting one or more systems corresponding to the impacted services identified within the dependency graph to resolve the incident.

12. The system of claim 11, wherein the one or more processors are further configured to construct the dependency graph utilizing the incident metadata, historical incident metadata, and current services information within the client system.

13. The system of claim 11, wherein the one or more processors are further configured to:
input the incident metadata into a trained machine learning environment; and
receive the dependency graph from the trained machine learning environment, wherein the machine learning environment is trained using input comprising historical incident metadata and labeled output comprising services within the client system that were directly and indirectly impacted by historical incidents to configure the dependency graph.

14. The system of claim 11, wherein the one or more processors are further configured to:
identify an occurrence of the incident in response to receiving one or more alerts each indicating a predetermined occurrence within a component of one or more alert sources; and
generate the incident metadata in response to identifying the occurrence of the incident.

15. The system of claim 11, wherein the responder impact includes a cost incurred by the one or more responders selected to respond to the incident.

16. The system of claim 11, wherein calculating the contractual impact of the incident on the client system includes:
identifying all services within the client system that are directly or indirectly impacted, utilizing the dependency graph; and
determining one or more contractual penalties, based on the estimated duration of impact for each of the services and one or more existing contracts associated with the client system.

17. The system of claim 11, wherein calculating the revenue impact of the incident on the client system includes:
identifying all services within the client system that are directly or indirectly impacted, utilizing the dependency graph; and
determining one or more revenue penalties, based on the estimated duration of impact for each of the services and predetermined time-based penalties determined for each of the services.

18. The system of claim 11, wherein the total impact analysis includes a total impact amount indicating a sum of costs of the responder impact, the contractual impact, and the revenue impact.

19. The system of claim 11, wherein the one or more processors are further configured to present the total impact analysis utilizing a graphical user interface (GUI).

20. A non-transitory computer-readable medium storing a set of instructions, the set of instructions when executed by one or more processors cause processing to be performed comprising:
receiving and processing, at one or more computing systems, data in real time transmitted from components deployed within a distributed computing environment, wherein the components include hardware components, and software components, wherein the software components include a plurality of services executing within the distributed computing environment;
receiving, at the one or more computing systems, application data associated with one or more distributed applications that execute within the distributed computing environment;
programmatically generating, based on the application data and the data, a plurality of ingested spans and a plurality of traces, wherein each of the plurality of traces is a collection of actions, or spans, that occur to complete a transaction within the distributed computing environment;
detecting an occurrence of an incident within a client system based, at least in part, on a programmatic analysis of the data and the plurality of traces;
identifying one or more responders selected to respond to the incident within the client system;

calculating a responder impact for the client system utilizing incident metadata including details of the incident within a client system and the one or more responders;

constructing a dependency graph detailing services from the plurality of services within the client system that are impacted by the incident by identifying interrelationships and dependencies between the services to analyze the plurality of traces to provide full-fidelity access to the application data;

determining an estimated duration of impact for each of the services;

calculating a contractual impact of the incident on the client system utilizing the incident metadata, the estimated duration, and the dependency graph;

calculating a revenue impact of the incident on the client system utilizing the incident metadata and the dependency graph;

determining a total impact analysis of the incident on the client system, utilizing the responder impact, the contractual impact, and the revenue impact;

comparing, by the computer system, the total impact analysis to total impact analyses generated for one or more additional incidents;

ranking, by the computer system, the incident and the additional incidents based on the comparing; and performing one or more actions at the client system according to the ranking, wherein the one or more automated actions comprise at least one of updating software, deleting software, or rebooting one or more systems corresponding to the impacted services identified within the dependency graph to resolve the incident.

* * * * *